United States Patent [19]

Zen-Ming

[11] Patent Number: 5,501,298
[45] Date of Patent: Mar. 26, 1996

[54] BRAKE MECHANISM

[76] Inventor: Chen Zen-Ming, P.O. Box 53-8, Taichung, Taiwan

[21] Appl. No.: 445,707

[22] Filed: May 22, 1995

[51] Int. Cl.⁶ ..................................................... B62L 1/06
[52] U.S. Cl. ................................ 188/24.19; 188/24.22
[58] Field of Search ............................. 188/24.12, 24.13, 188/24.14, 24.19, 24.21, 24.22, 73.1, 250 B

[56] References Cited

U.S. PATENT DOCUMENTS

| | | | |
|---|---|---|---|
| 5,117,948 | 6/1992 | Yoshigai | 188/24.12 |
| 5,152,377 | 10/1992 | Yoshigai | 188/24.12 |
| 5,293,964 | 3/1994 | Li | 188/24.21 |

*Primary Examiner*—Robert J. Oberleitner
*Assistant Examiner*—Chris Schwartz

[57] ABSTRACT

A brake mechanism for a bicycle includes a clamper having a pair of walls for engaging with an actuating arm and having a bar bridging the gap formed between the walls. A bolt is engaged through the walls and engaged with a nut, and includes a head formed in the other end. The head includes a puncture for engaging with a rod of a brake shoe. The rod is adjustable relative to the head before the nut is threaded to the bolt. The bar prevents the end portions of the walls from engaging with each other such that the walls may be forced to solidly engage with the actuating arm.

2 Claims, 2 Drawing Sheets

BRAKE MECHANISM

BACKGROUND OF THE INVENTION

1. Field of the Invention

The present invent ion relates to a brake mechanism, and more particularly to a brake mechanism for bicycles.

2. Description of the Prior Art

Typical brake mechanisms for bicycles comprise a pair of actuating arms each having a brake shoe secured thereto for engaging with bicycle wheels so as to brake the wheels. Two typical brake mechanisms are disclosed in U.S. Pat. No. 4,611,692 to Everett, filed Dec. 6, 1984; and U.S. Pat. No. 4,901,823 to Chang, filed Nov. 10, 1988. The brake shoes may not be adjusted relative to the actuating arms.

The present invention has arisen to mitigate and/or obviate the afore-described disadvantages of the conventional brake mechanisms.

SUMMARY OF THE INVENTION

The primary objective of the present invention is to provide a brake mechanism which includes a brake shoe that may be solidly secured to the actuating arm.

The other objective of the present invention is to provide a brake mechanism which includes a brake shoe that may be adjusted relative to the actuating arm.

In accordance with one aspect of the invention, there is provided a brake mechanism for a bicycle comprising an actuating arm for securing to the bicycle, a clamper including a pair of walls, the walls including a gap formed therebetween and including a first end portion having an opening formed therein for engaging with the actuating arm and including a second end portion having a bar bridging the gap, a bolt including a first end engaged through the walls and threadedly engaged with a nut, and including a second end having a head formed thereon, the head including a puncture laterally formed therein, and a brake shoe including a rod engaged within the puncture of the head. The rod is forced to engage with the clamper when the nut is threaded to the bolt, and the rod is adjustable relative to the head before the nut is threaded to the bolt. The bar is provided to prevent the end portions of the walls from engaging with each other such that the walls may be forced to solidly engage with the actuating arm by the bolt and the nut.

One of the walls includes a recess formed therein, the brake mechanism further includes a ring having a shoulder for engaging with the recess of the clamper and having a hole formed therein, the head is spherical for engaging with the hole of the ring.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
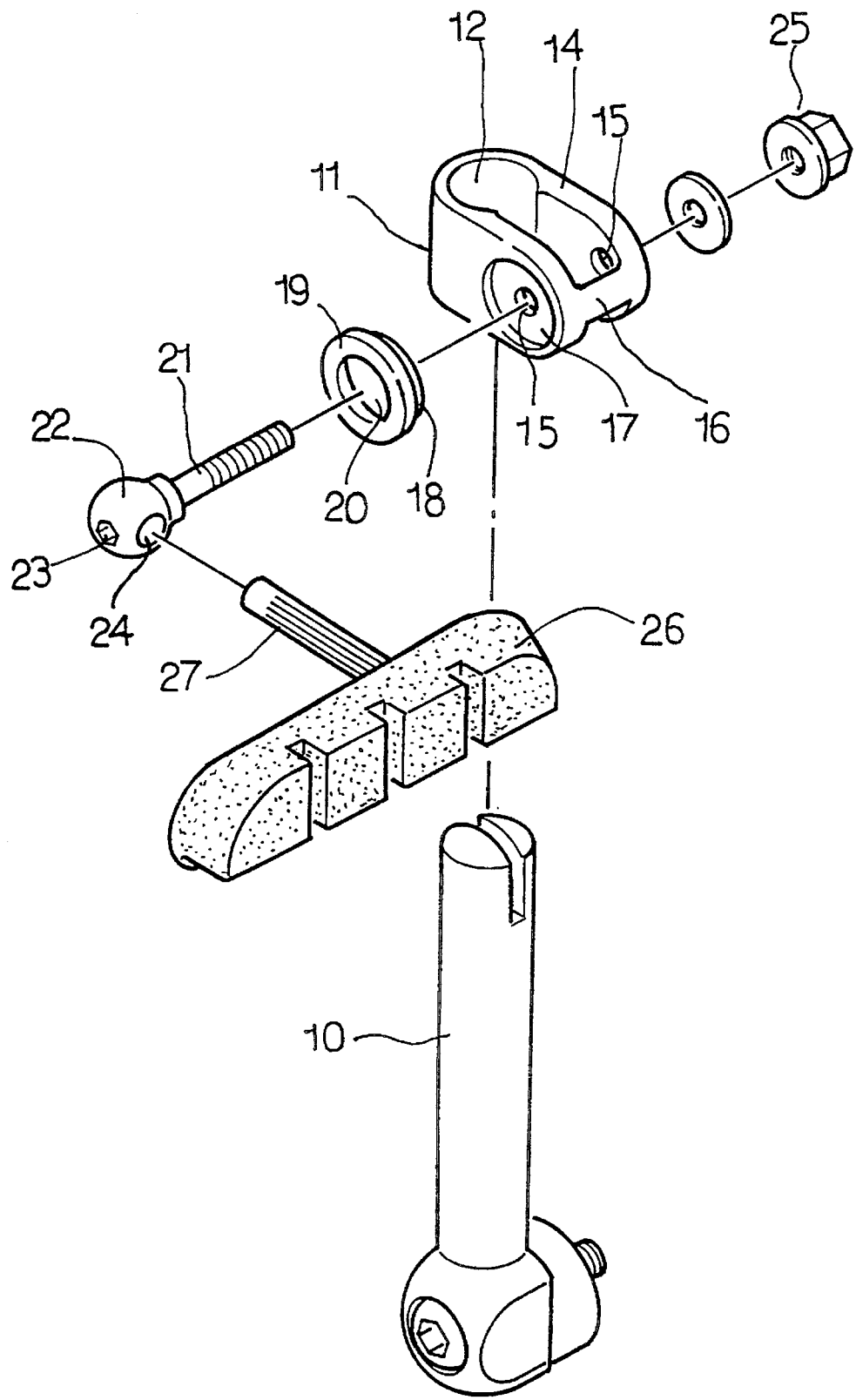
FIG. 1 is an exploded view of a brake mechanism for a bicycle in accordance with the present invention.
Figure 2:
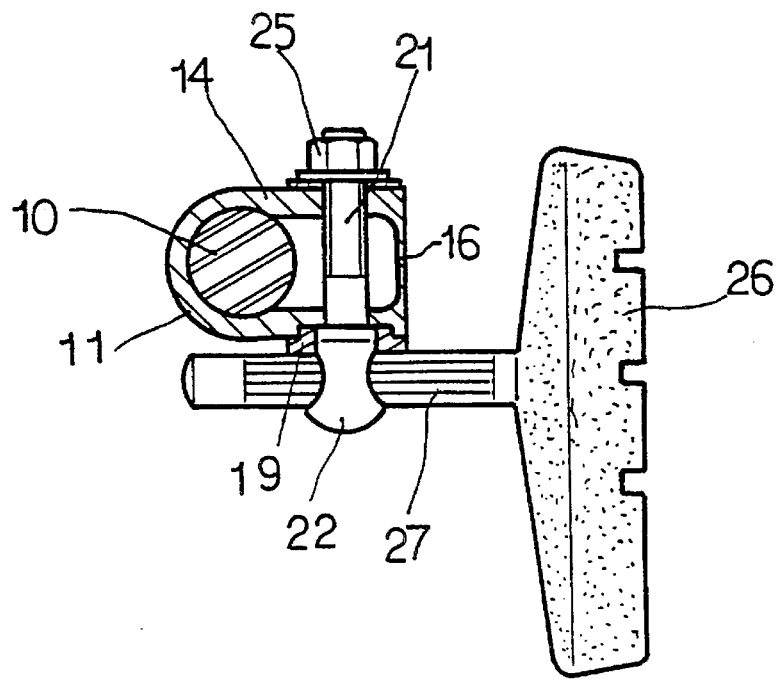
FIG. 2 is a partial cross sectional view of the brake mechanism.

Referring to the drawings, and initially to FIGS. 1 and 2, a brake mechanism for a bicycle in accordance with the present invention comprises an actuating arm 10 for securing to the bicycle and for coupling to the conventional brake cable. A clamper 11 includes an opening 12 formed in one end thereof for engaging with the actuating arm 10 and includes a pair of walls 14 each having an orifice 15 formed therein for engaging with a bolt 21. The clamper 11 includes a bar 16 formed on the other end of the walls 14 for bridging the gap formed between walls 14. One of the walls 14 includes a recess 17 formed therein for engaging with a shoulder 18 of a ring 19 which includes a hole 20 formed therein.

The bolt 21 is engaged through the hole 20 of the ring 19 and through the orifices 15 of the walls 14 and is threadedly engaged with a nut 25. The bolt 21 includes a substantially spherical head 22 formed on one end for engaging with the hole 20 of the ring 19 and includes an engaging aperture 23 formed in the head 22 for engaging with a wrench so as to rotate the bolt 21. The head 22 further includes a puncture 24 laterally formed therein for engaging with a rod 27 extended from a brake shoe 26. The rod 27 is forced to engage with the ring 19 when the nut 25 is engaged with the bolt 21 such that the brake shoe 26 may be solidly secured to the actuating arm 10.

Figure 3:
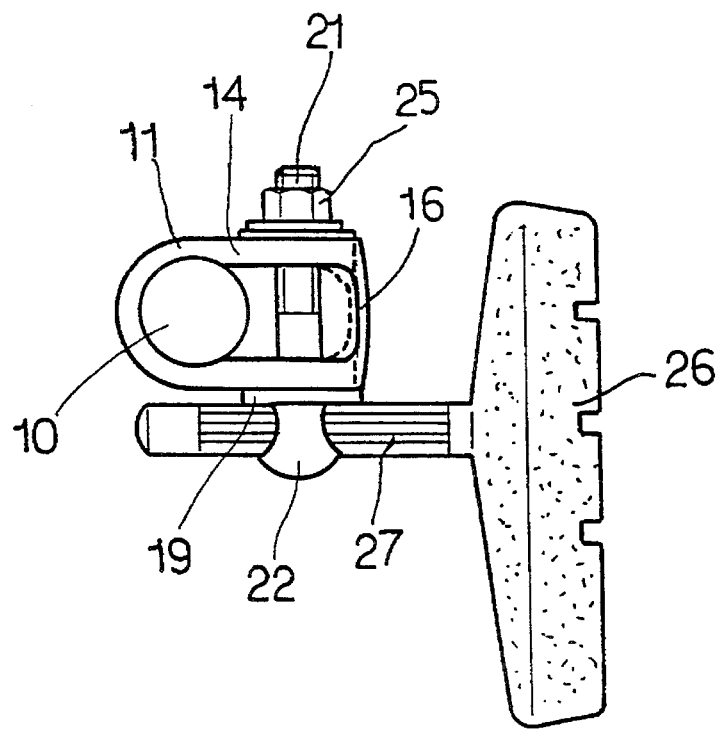
FIG. 3 is a schematic view illustrating the operation of the brake mechanism.

In operation, as shown in FIG. 3, when the head 22 of the bolt 21 is forced to engage within the hole 20 of the ring 19 by the threading engagement between the bolt 21 and the nut 25, the rod 27 may be forced to engage with the ring 19 such that the brake shoe 26 may be solidly secured to the actuating arm 10. When the nut 25 is further threaded relative to the bolt 21, the bar 16 may be forced to slightly curve outward. The bar 16 is provided to prevent the end portions of the walls 14 from engaging with each other such that the walls 14 may be forced to solidly engage with the actuating arm 10 by the bolt 21 and the nut 25. The rod 27 may be adjusted relative to the head 22 before the bolt 21 and nut 25 are solidly secured together.

Accordingly, the brake mechanism in accordance with the present invention includes a brake shoe that may be solidly secured to the actuating arm and that may be adjusted relative to the actuating arm. The bar is provided to prevent the end portions of the walls from engaging with each other such that the walls may be forced to solidly engage with the actuating arm by the bolt and the nut.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A brake mechanism for a bicycle comprising:

an actuating arm for securing to the bicycle, a clamper including a pair of walls, said walls including a gap formed therebetween and including a first end portion having an opening formed therein for engaging with said actuating arm and including a second end portion having a bar bridging said gap, a bolt including a first end engaged through said walls and threadedly engaged with a nut, and including a second end having a head formed thereon, said head including a puncture laterally formed therein, and a brake shoe including a rod engaged within said puncture of said head, said rod being forced to engage with said clamper when said nut is threaded to said bolt, and said rod being adjustable relative to said head before said nut is threaded to said bolt.

2. A brake mechanism according to claim 1, wherein a first of said walls includes a recess formed therein, said brake mechanism further includes a ring having a shoulder for engaging with said recess of said clamper and having a hole formed therein, said head is spherical for engaging with said hole of said ring.

* * * * *